No. 753,924. PATENTED MAR. 8, 1904.
J. E. SIEBEL.
APPARATUS FOR STERILIZING, HEATING, AND BOILING LIQUIDS.
APPLICATION FILED JAN. 19, 1903.
NO MODEL. 2 SHEETS—SHEET 1.
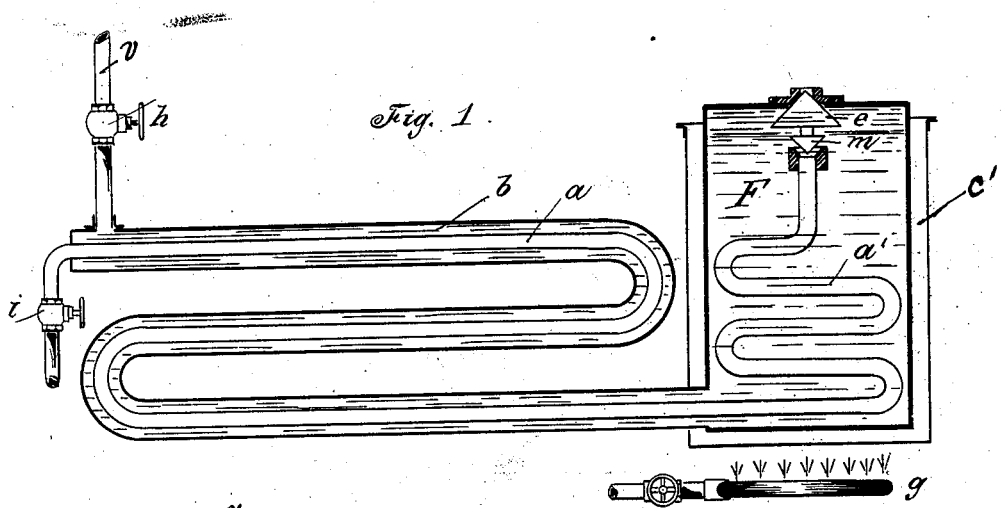
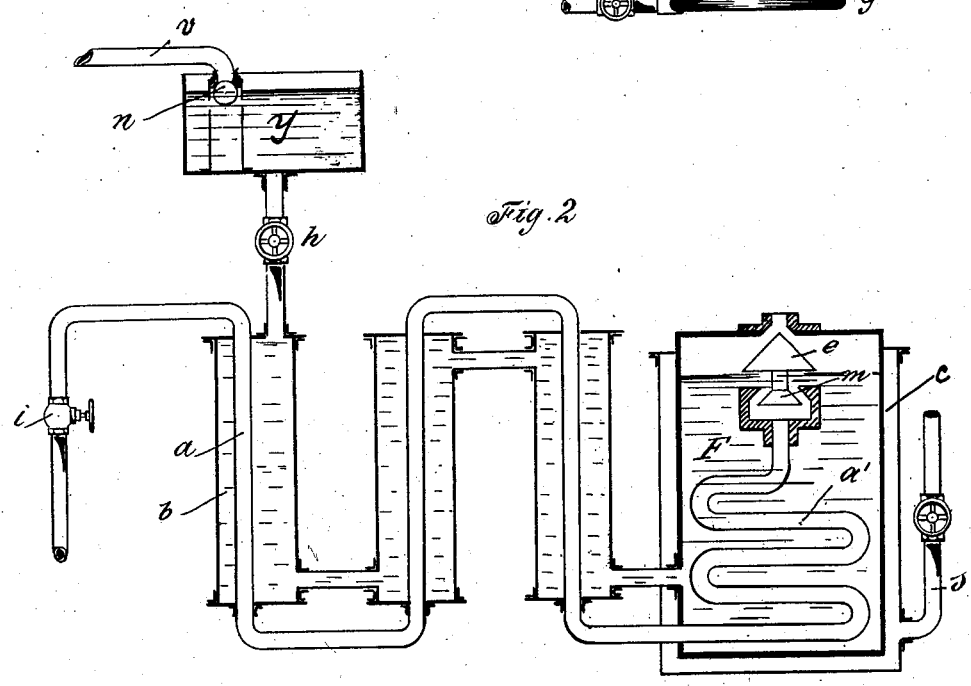
WITNESSES
Robt. Klotz
Carl Haerting
INVENTOR
John E. Siebel.

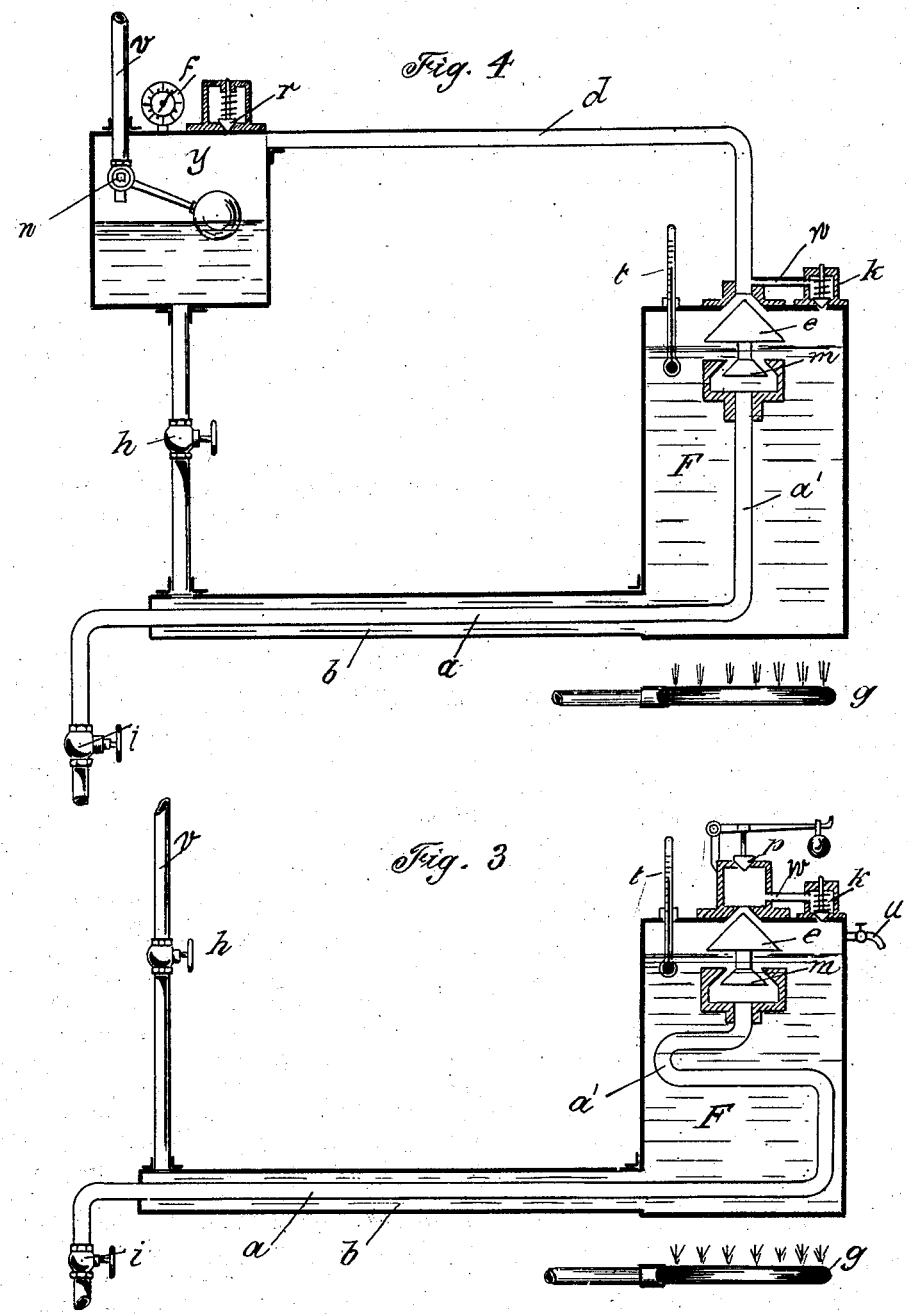

No. 753,924. Patented March 8, 1904.

UNITED STATES PATENT OFFICE.

JOHN E. SIEBEL, OF CHICAGO, ILLINOIS.

APPARATUS FOR STERILIZING, HEATING, AND BOILING LIQUIDS.

SPECIFICATION forming part of Letters Patent No. 753,924, dated March 8, 1904.

Application filed January 19, 1903. Serial No. 139,683. (No model.)

*To all whom it may concern:*

Be it known that I, JOHN E. SIEBEL, a citizen of the United States, residing at Chicago, in the county of Cook and State of Illinois, have invented certain new and useful Improvements in Apparatus for Sterilizing, Heating, and Boiling Liquids, of which the following is a clear description, which will enable others skilled in the art to make and use the same.

The object of my invention is a more complete utilization of the heat used for sterilizing, heating, and boiling water and other liquids at a given temperature and pressure and in regulating the time during which liquids are exposed to such treatment.

My invention consists in providing means for the removal of volatile matter, which may be discharged by the liquid under treatment without interfering with the process of sterilization or heating.

I attain these objects by means of the device illustrated in Figure 1 of the accompanying drawings, Figs. 2, 3, and 4 showing modifications of the same.

The drawings show vertical sectional views, in which like parts are designated by like letters in the different figures of the drawings.

Referring more particularly to Fig. 1, it shows an outer space or receptacle, preferably a pipe $b$, surrounding an inner space or receptacle, preferably a pipe $a$, arranged in such a manner as to separate a flow of liquid which goes in opposite directions through the inner and outer pipe. The pipe or receptacle $b$ is provided with an inlet-pipe $v$ and valve $h$ to introduce the water or liquid to be treated, while a valve $i$, connected with the inner receptacle or pipe $a$, serves for the withdrawal of the sterilized liquid. Both pipes $a$ and $b$ terminate into a common receptacle F, which may be heated directly, preferably by a gas-burner $g$, as shown in Figs. 3 and 4, or indirectly by a steam-jacket $c$, as shown in Fig. 2, $s$ being the steam-inlet into the steam-jacket $c$. It may also be heated by a liquid-bath, as shown in Fig. 1, the liquid being water, glycerine, or some other liquid or solution inclosed in the space $c'$.

The water or other liquid to be treated after entering the space $b$ through the valve $h$ passes through space $b$ into the common receptacle F, whence it passes through the valve $m$ and through the pipe $a'$ through the inner receptacle $a$ to the outflow at $i$. The heat imparted to the water in receptacle F is carried off through the receptacle or pipe $a$ and on its way to the outlet is imparted to the water coming in through pipe $b$, which brings it back to receptacle F again. In this manner nearly all the heat required for sterilizing is used over and over again, except the amount lost by radiation, which must be replaced by outside heat, as indicated, by the heater $g$; but this amount can be reduced to a minimum if the whole apparatus is properly insulated.

The time during which the liquid is exposed to the temperature obtaining in the receptacle F is regulated by the length of the extension $a'$ of the inner pipe into receptacle F, which can be varied, as shown in the drawings, by running this pipe up straight, as shown at $a'$, Fig. 4, or by giving it a greater or lesser number of turns, as shown in $a'$, Figs. 3, 2, and 1.

It is readily seen that the longer is the extension of pipe $a'$ into receptacle F the longer will be the time during which the liquid is exposed to the temperature in receptacle F.

The removal of the volatile matter which may be discharged from the liquid during heating or boiling is regulated by a device of special construction, consisting of the two valves $e$ and $m$, the latter of which must be passed by the liquid before it can pass from the outer pipe $b$ through the receptacle F into the extension-pipe $a'$ of the pipe $a$. The upper valve $e$ of the combination-valve $e\,m$ is made hollow, so as to float on water, thereby causing it to close whenever the liquid in the receptacle F rises above the lower line of the valve $e$. The lower valve $m$ of the combination-valve $e\,m$ may be arranged, as in Fig. 1, so as to open when valve $e$ closes and close when valve $e$ opens, or the valve $m$ of the combination-valve $e\,m$ may be arranged, as shown in Figs. 2, 3, and 4, so as to open when valve $e$ opens and close when valve $e$ closes.

The arrangement of the combination-valve $e\,m$, as shown in Fig. 1, is preferable when liquids are to be sterilized below the boilingpoint and at atmospheric pressure or but little above; but when the liquid is subjected to boiling or to a higher pressure, or both, the arrangement of the combination-valve $e$ $m$, as shown in Figs. 2, 3, and 4, is preferable.

The position of the combination-valve $e$ $m$, as shown in Fig. 1, shows the valve $e$ closed, the liquid in receptacle F standing above the lower edge of the valve $e$.

When by the discharge of gases from the liquid in receptacle F the latter falls below that line, the valve $e$ opens and at the same time the valve $m$ closes until the gases have made their escape at valve $e$, when both valves take their former position—that is, the position shown in Fig. 1—and the liquid is again allowed to circulate.

When the liquid is to be boiled and gases are apt to be discharged constantly, the position of the valves as shown in Figs. 2, 3, and 4 is to be preferred, for the reason that this allows the discharge of the gases and vapors and circulation at the same time, and this arrangement of the valves $m$ and $e$ insures their closing when the vapors of the boiling liquid are not of sufficient tension and temperature, which is regulated by the pressure under which the liquid enters the apparatus through the pipe $v$ and valve $h$. This pressure can be regulated by drawing the water from a fixed level by the pipe $v$ or in various other ways, preferably in case of very low pressure by means of an open receptacle $y$ and an automatic shut-off inlet-valve $n$, wherein a floating ball closes the inlet when the water reaches a certain height in the open vessel $y$, as shown in Fig. 2. If the pressure is higher, the water-receptacle $y$ may be closed, and the valve $n$ may be closed by means of a float, as shown in Fig. 4. In this case the receptacle $y$ may also be provided with a safety-valve $r$ and pressure-gage $f$.

In case the pressure under which the sterilization, heating, or boiling of the liquid takes place is higher than an inch of mercury, the receptacle F should be provided with a compensating valve $p$, as shown in Fig. 3, by the regulation of which valve the pressure of the liquid coming through pipe $v$ is compensated, so as to prevent the closing of the valve $e$ by pressure unless the same is assisted by the buoyancy of the valve $e$.

In order to guard against any undue pressure in the receptacle F, the same may be provided with a valve $k$. This valve may also be used to equalize the pressure in receptacle F and under the valve $p$ in Fig. 3, for which purpose the valve $k$ is connected with the valve $p$ by means of a connection $w$.

Another way for compensating the pressure of the inflowing liquid is shown in Fig. 4, where the outlet of the valve $e$ is connected with the upper part of the receptacle $y$ by means of a pipe $d$, which pipe is also connected with the equalizing-valve $k$ by means of the connection $w$.

In order to explain more fully the coaction of the valves $m$, $e$, K, and $p$, Fig. 3, it must be understood that the valve $p$ is adjusted to the same pressure as that obtaining in the inflow-pipe $v$. The valve $k$, however, is adjusted to a little higher pressure. If for any reason the pressure above receptacle F, Fig. 3, goes much below that obtaining in the pipe $v$, then the water in receptacle F will rise, as the valve $i$ is regulated not to pass as much water as pipe $v$ will furnish under these conditions. The rising water above receptacle F closes the valves $m$ and $e$, thus stopping inflow and outflow of water for receptacle F entirely. The continuing addition of heat from burner $g$ to body of liquid in receptacle F increases the pressure above receptacle F again, and when it reaches that indicated by the pressure of valve $k$ some of the liquid will be forced back into pipe $v$, whereby the valves $e$ $m$ drop, for the body of the valves $e$ $m$ is so adjusted that its own weight, together with the pressure indicated by the adjustment of valve $p$, will overcome the pressure indicated by the adjustment of valve $k$. On the other hand, if the pressure above receptacle F should exceed the desired limit it blows off through valve $p$ directly, or, in case the valve $e$ is closed, indirectly by way of the valve $k$ through pipe $w$ and valve $p$ into the air. The valves $e$, $m$, and $k$ and the pipe $w$ in Fig. 4 have exactly the same functions as the elements designed with like letters in Fig. 3, and the valve $r$, Fig. 4, has the same functions as the valve $p$ in Fig. 3 regulating in addition also the pressure in the receptacle $y$.

The apparatus may also be provided with a thermometer $t$, as shown in Figs. 3 and 4, and with a try-cock $u$, as shown in Fig. 3, to try if the upper space of the receptacle F contains steam, gases, or water. There may also be employed a pressure-gage $f$, as shown in Fig. 4. However, I lay no special claim to the connection of these devices with a sterilizing apparatus; but

What I claim is—

1. In apparatus for sterilizing, heating and boiling liquid an inner and outer receptacle merging into a common heatable receptacle inside of which the inner receptacle is continued, the length of this continuation or extension being determined by the length of time during which the liquid is to be treated as described.

2. In apparatus for sterilizing, heating and boiling liquid an inner and outer receptacle merging into a common heatable receptacle inside of which the inner receptacle is extended, in connection with a combination-valve to mediate the escape of volatile matter as described.

3. In apparatus for sterilizing, heating and boiling liquid an inner and outer receptacle merging into a common heatable receptacle inside of which the inner receptacle is extended in connection with a combination-valve and an equalizing-valve as described.

4. In apparatus for sterilizing, heating and boiling liquids an outer receptacle or pipe $b$ and inner receptacle or pipe $a$ merging into a common heatable receptacle F the inner pipe $a$ extending into receptacle F forming the pipe $a'$ by the length of which the time of sterilization is regulated as set forth.

5. In apparatus for sterilizing, heating and boiling liquids an outer receptacle or pipe $b$ and an inner receptacle or pipe $a$ merging into a common heatable receptacle F the inner pipe $a$ extending into receptacle F forming the pipe $a'$ by the length of which the time of sterilization is regulated the latter being provided with a combination-valve $e\ m$ as set forth.

6. In apparatus for sterilizing, heating and boiling liquids an outer receptacle or pipe $b$ and an inner receptacle or pipe $a$ merging into a common heatable receptacle F, the inner pipe $a$ extending into receptacle F forming the pipe $a'$ by the length of which the time of sterilization is regulated the latter being provided with a combination-valve $e\ m$ in connection with a compensating valve $p$ and an equalizing-valve $k$, as described.

7. In apparatus for sterilizing, heating and boiling liquids an outer receptacle or pipe $b$ and inner receptacle or pipe $a$ merging into a common heatable receptacle F the inner pipe $a$ extending into receptacle F forming the pipe $a'$ by the length of which the time of sterilization is regulated and the latter being provided with a combination-valve $e\ m$ in connection with the pipe $d$ leading to the water-receptacle $y$ and the equalizing-valve $k$.

8. In apparatus for sterilizing, heating and boiling liquids an outer receptacle or pipe $b$ and an inner receptacle or pipe $a$ merging into a common heatable receptacle F which is provided with a valve $k$, the inner pipe $a$ extending into receptacle F forming the pipe $a'$ by the length of which the time of sterilization is regulated and to be provided with the combination-valve $e\ m$.

In testimony whereof I have signed my name to this specification in the presence of two subscribing witnesses.

JOHN E. SIEBEL.

Witnesses:
ELISE E. GREWATZ,
CARL HAERTING.